US010059602B2

(12) United States Patent
Schroedle

(10) Patent No.: US 10,059,602 B2
(45) Date of Patent: Aug. 28, 2018

(54) PROCESS FOR PRODUCING SUSPENSIONS

(71) Applicant: BASF SE, Ludwigshafen (DE)

(72) Inventor: Simon Schroedle, Westfield, NJ (US)

(73) Assignee: BASF SE, Ludwigshafen (DE)

( * ) Notice: Subject to any disclaimer, the term of this patent is extended or adjusted under 35 U.S.C. 154(b) by 311 days.

(21) Appl. No.: 14/889,928

(22) PCT Filed: May 6, 2014

(86) PCT No.: PCT/EP2014/059194
§ 371 (c)(1),
(2) Date: Nov. 9, 2015

(87) PCT Pub. No.: WO2014/180821
PCT Pub. Date: Nov. 13, 2014

(65) Prior Publication Data
US 2016/0115043 A1   Apr. 28, 2016

(30) Foreign Application Priority Data

May 8, 2013  (EP) ................................ 13166994

(51) Int. Cl.
| | |
|---|---|
| *C01G 53/00* | (2006.01) |
| *C01B 32/60* | (2017.01) |
| *H01M 10/0525* | (2010.01) |
| *H01M 4/58* | (2010.01) |
| *H01M 4/525* | (2010.01) |
| *H01M 4/505* | (2010.01) |
| *B01D 9/00* | (2006.01) |
| *C01G 1/00* | (2006.01) |
| *C01B 13/36* | (2006.01) |
| *H01M 4/02* | (2006.01) |
| *B01D 21/00* | (2006.01) |

(52) U.S. Cl.
CPC ......... *C01G 53/006* (2013.01); *B01D 9/0045* (2013.01); *B01D 9/0054* (2013.01); *C01B 13/363* (2013.01); *C01B 32/60* (2017.08); *C01G 1/00* (2013.01); *H01M 4/505* (2013.01); *H01M 4/525* (2013.01); *H01M 4/5825* (2013.01); *H01M 10/0525* (2013.01); *B01D 21/0039* (2013.01); *C01P 2004/32* (2013.01); *C01P 2004/52* (2013.01); *C01P 2004/61* (2013.01); *C01P 2006/40* (2013.01); *H01M 2004/028* (2013.01)

(58) Field of Classification Search
CPC ........ C01G 53/006; C01G 1/00; C01B 32/60; C01B 13/363; H01M 10/0525; H01M 4/5825; H01M 4/525; H01M 4/505; H01M 2004/028; B01D 9/0054; B01D 9/0045; B01D 21/0039; C01P 2006/40; C01P 2004/32; C01P 2004/61; C01P 2004/52
See application file for complete search history.

(56) References Cited

U.S. PATENT DOCUMENTS

| | | | |
|---|---|---|---|
| 2011/0300470 A1* | 12/2011 | Olbrich | ................ B01D 9/0013 429/527 |
| 2012/0080649 A1 | 4/2012 | Koenig, Jr. et al. | |
| 2013/0202502 A1* | 8/2013 | Schulz-Dobrick | ...... C22B 47/00 423/50 |

FOREIGN PATENT DOCUMENTS

| | | |
|---|---|---|
| DE | 10 2006 015 538 | 10/2007 |
| EP | 1 189 296 | 3/2002 |
| WO | 2004 032260 | 4/2004 |

OTHER PUBLICATIONS

U.S. Appl. No. 14/889,577, filed Nov. 6, 2015, Schroedle, et al.
U.S. Appl. No. 14/889,663, filed Nov. 6, 2015, Schroedle, et al.
U.S. Appl. No. 14/889,602, filed Nov. 6, 2015, Schroedle, et al.
Gary M. Koenig, Jr., et al., "Composition-Tailored Synthesis of Gradient Transition Metal Precursor Particles for Lithium-Ion Battery Cathode Materials" Chemistry of Materials, vol. 23, 2011, pp. 1954-1963.
Youyuan Huang, et al., "A modified $Al_2O_3$ coating process to enhance the electrochemical performance of $Li(Ni_{1/3}Co_{1/3}Mn_{1/3})O_2$ and its comparison with traditional $Al_2O_3$ coating process" Journal of Power Sources, vol. 195, 2010, pp. 8267-8274.
K.K. Cheralathan, et al., "Preparation of spherical $LiNi_{0.80}Co_{0.15}Mn_{0.05}O_2$ lithium-ion cathode material by continuous co-precipitation" Journal of Power Sources, vol. 195, 2010, pp. 1486-1494.
Zhenlei Huang, et al., "Well-ordered spherical $LiNi_xCo_{(1-2x)}Mn_xO_2$ cathode materials synthesized from cobolt concentration-gradient precursors" Journal of Power Sources, vol. 202, 2012, pp. 284-290.
Yang-Kook Sun, et al., "A novel concentration-gradient $Li[Ni_{0.83}Co_{0.07}Mn_{0.10}]O_2$ cathode material for high-energy lithium-ion batteries" Journal of Materials Chemistry, vol. 21, 2011, pp. 10108-10112.
Yang-Kook Sun, et al., "A Novel Cathode Material with a Concentration-Gradient for High-Energy and Safe Lithium-Ion Batteries" Advanced Functional Materials, vol. 20, 2010, pp. 485-491.

(Continued)

*Primary Examiner* — Peter F Godenschwager
*Assistant Examiner* — Andrew J. Oyer
(74) *Attorney, Agent, or Firm* — Oblon, McClelland, Maier & Neustadt, L.L.P.

(57) ABSTRACT

Process for producing a suspension by precipitation of a solid from a solution, wherein at least two solutions of salts are combined with one another in a stirred vessel so as to form a sparingly soluble solid, where
portions of suspension are taken off continuously or discontinuously,
the portions taken off in this way are processed in a combination of two separation apparatuses, where
gas is separated off in a first separation apparatus which is selected from liquid-gaseous separation apparatuses,
and mother liquor is separated off from precipitated sparingly soluble solid in a second separation apparatus selected from solid-liquid separation apparatuses, and the mother liquor is taken off,
and the solid which has been separated off or enriched in this way is returned to the reaction mixture.

10 Claims, No Drawings

(56) References Cited

OTHER PUBLICATIONS

Yang-Kook Sun, et al., "High-voltage performance of concentration-gradient Li[Ni$_{0.87}$Co$_{0.15}$Mn$_{0.18}$]O$_2$ cathode material for lithium-ion batteries" Electrochimica Acta, vol. 55, 2010, pp. 8621-8627.

Yang-Kook Sun, et al., "High-energy cathode material for long-life and safe lithium batteries" Nature Materials, vol. 8, 2009, pp. 320-324.

Gu Da-Ming, et al., "Electrochemical Performance of LiCoO$_2$ Gradient Coated LiNi$_{0.88}$Co$_{0.04}$O$_2$ Cathode" Chinese Journal of Inorganic Chemistry, vol. 21, No. 5, 2005, pp. 725-728 (with English Abstract).

Zonghai Chen, et al., "Advanced cathode materials for lithium-ion batteries" MRS Bulletin, vol. 36, 2011, pp. 498-505.

* cited by examiner

PROCESS FOR PRODUCING SUSPENSIONS

The present invention relates to a process for producing a suspension by precipitation of a solid from a solution, wherein at least two solutions of salts are combined with one another in a stirred vessel so as to form a sparingly soluble solid, where portions of suspension are taken off continuously or discontinuously, the portions taken off in this way are processed in a combination of two separation apparatuses, where gas is separated off in a first separation apparatus which is selected from liquid-gaseous separation apparatuses, and mother liquor is separated off from precipitated sparingly soluble solid in a second separation apparatus selected from solid-liquid separation apparatuses, and the mother liquor is taken off, and the solid which has been separated off or enriched in this way is returned to the reaction mixture.

Secondary batteries, accumulators or "rechargeable batteries" are only some embodiments which allow electric energy to be stored after generation and to be utilized (consumed) when required. Owing to the significantly better power density, designers have recently moved away from water-based secondary batteries and have developed batteries in which charge transport is effected by lithium ions.

The electrode material is of critical importance for the properties of a lithium ion battery. Here, lithium-comprising transition metal mixed oxides have attained particular importance, for example spinels and sheet-like mixed oxides, in particular lithium-comprising mixed oxides of nickel, manganese and cobalt, see, for example, EP 1 189 296. Here, not only the stoichiometry of the electrode material but also other properties such as morphology and surface properties play a role.

A two-stage process is generally employed for producing such mixed oxides. In a first stage, a sparingly soluble salt of the transition metal or metals is prepared by precipitating it from a solution, for example a carbonate or a hydroxide. This sparingly soluble salt is frequently also referred to as intermediate or precursor. In a second stage, the precipitated salt of the transition metal or metals is mixed with a lithium compound, for example, $Li_2CO_3$, LiOH or $Li_2O$, and the mixture is calcined at high temperatures, for example from 600 to 1100° C.

DE 10 2006 015 538 discloses a process for preparing compounds by precipitation, which employs a reactor having an integrated baffle plate thickener. By means of this integrated baffle plate thickener, suspension is taken from the reactor and separated into firstly a mother liquor having a defined proportion of fines and secondly product suspension. The mother liquor having a defined proportion of fines is then recirculated to the reactor. However, considerable volumes are required to produce solids.

Lithium ion batteries known hitherto have potential for improvement, in particular as regards the power rating.

It was therefore an object of the invention to provide a process by means of which suitable cathode materials for lithium ion batteries can be produced.

It has been found that a narrow particle diameter distribution of electrode materials, in particular of cathode materials, can be advantageous. It has also been found that the particle diameter distribution of the precursor in many cases corresponds to the particle diameter distribution of the cathode material. In particular, it was therefore an object of the invention to provide a process by means of which precursors having a particularly narrow particle diameter distribution can be produced.

We have accordingly found the process defined at the outset, also referred to as process of the invention for short. The process of the invention relates to precipitation of a solid from a solution, wherein at least two aqueous solutions of salts are combined with one another in a stirred vessel so as to form a sparingly soluble solid.

The solid to be precipitated can be uniform or nonuniform, i.e. particles of the precipitated solid can in terms of their particle diameter have a uniform or nonuniform composition. The solid to be precipitated can also consist of particles having the same composition or different compositions. The solid to be precipitated preferably consists essentially of the same type of particles which in turn have a uniform or nonuniform composition in terms of their particle diameter.

As stirred vessel, it is possible to use stirred containers having any geometry, for example, stirred tanks, stirred tubes and cascades of stirred tanks. Preference is given to stirred tanks. Suitable stirrers are, for example, anchor stirrers, turbo stirrers and propeller stirrers and inclined-blade stirrers whose stirring action can be reinforced by baffles installed in the stirred vessel.

According to the invention, the precipitation is effected by combining at least two solutions of salts, for example, three or four solutions, preferably two solutions of salts, with one another in the stirred vessel. Here, at least two of the solutions to be combined comprise different salts.

Preference is given to the one solution comprising a salt of at least one cation and the other comprising a salt of at least one anion, which together form a sparingly soluble solid. For the present purposes, "sparingly soluble" is intended to describe solids which, under the process conditions in the stirred vessel, have a solubility of 0.1 g or less in water, measured at the temperature at which the process of the invention is carried out.

In an embodiment of the present invention, sparingly soluble solids are selected from among hydroxides and carbonates of transition metals, preferably of transition metals of the first period, for example, of titanium, vanadium, chromium, manganese, iron, nickel, cobalt and zinc.

Here, the hydroxides of transition metals can be transition metal hydroxides having a stoichiometric composition, for example of the formula $Me(OH)_2$, or basic hydroxides or water-containing oxides which are generally described by the formula MeO.aq, where Me is a transition metal. In the case of Me=titanium, hydroxides can preferably be $TiO_2$.aq or $Ti_2O_3$.aq. In the case of carbonates of transition metals, these can be transition metal carbonates having a stoichiometric composition, for example of the formula $MeCO_3$, or basic carbonates.

In an embodiment of the present invention, sparingly soluble solids are selected from among mixed hydroxides and carbonates of nickel, cobalt and manganese.

For the purposes of the present invention, solutions of salts are preferably aqueous solutions.

As solutions of anions, it is possible to use, for example, aqueous solutions of carbonates, hydrogencarbonates or in particular hydroxides, for example in the form of their ammonium or preferably alkali metal salts, with particular preference being given to potassium (hydrogen)carbonate and potassium hydroxide and very particular preference being given to sodium (hydrogen)carbonate and sodium hydroxide.

In an embodiment of the present invention, an aqueous solution of alkali metal hydroxide has a concentration of alkali metal hydroxide in the range from 1 to 50% by weight, preferably from 10 to 25% by weight. In another embodiment of the present invention, an aqueous solution of alkali metal (hydrogen)carbonate has a concentration of alkali metal (hydrogen)carbonate in the range from 1% by weight to not more than a saturated solution, in the case of $NaHCO_3$ up to 10% by weight, in the case of $Na_2CO_3$ up to 21.5% by weight, in each case at 20° C., or more at a higher temperature.

As solutions of cations, it is possible to select, for example, aqueous solutions of transition metal cations, for example in the oxidation state +2. Here, solutions of complexes of the corresponding transition metals and in particular solutions of their hydrate complexes are likewise considered to be solutions of the transition metal cations concerned. Preference is given to aqueous solutions of transition metals of the first period, for example of titanium, vanadium, chromium, manganese, iron, nickel, cobalt and zinc. In solutions of titanium cations, however, the titanium is preferably present in the oxidation state +3 or +4.

As counterions for solutions of cations, it is possible to select, for example, sulfates, acetates, nitrates or halides, for example bromides or in particular chlorides, with preference being given to sulfates.

Solutions of cations can comprise one or more different transition metals in the form of their salts and preferably comprise two, three or four different transition metals in the form of their salts, in particular their sulfates. Solutions of cations very particularly preferably comprise salts of nickel, cobalt and manganese.

In an embodiment of the present invention, the concentrations of an aqueous solution of cations can be selected within a wide range. The concentrations are preferably selected so as to be in the range of a total of from 1 to 1.8 mol of transition metal/kg of solution, with particular preference being given to from 1.5 to 1.7 mol of transition metal/kg of solution.

In an embodiment of the present invention, more than two aqueous solutions of salts are combined. This can be carried out by combining an aqueous solution of solutions of carbonates, hydrogencarbonates or in particular hydroxides with various aqueous solutions of cations of transition metals, for example with at least two different aqueous solutions of cations of transition metals, where the at least two different aqueous solutions of cations of transition metals differ in terms of type or concentration ratios of the corresponding transition metal cations.

In an embodiment of the present invention, more than two aqueous solutions of salts are combined. This can be carried out by combining at least two different aqueous solutions of carbonates, hydrogencarbonates or in particular hydroxides with one or more aqueous solutions of cations of transition metals, for example with at least two different aqueous solutions of cations of transition metals, where the at least two different aqueous solutions of cations of transition metals differ in terms of type or concentration ratios of the corresponding transition metal cations and the at least two aqueous solutions of carbonates, hydrogencarbonates or in particular hydroxides in each case differ in terms of the concentration or in terms of at least one additive. Suitable additives can, for example, be ligands, in particular amines or ammonia.

In another embodiment of the present invention, precisely two aqueous solutions of salts are combined.

The at least two aqueous solutions are combined by introducing them into a stirred vessel. Combining can be carried out by introducing the at least two aqueous solutions simultaneously dropwise or simultaneously in a jet into the stirred vessel, or by placing the one aqueous solution in the stirred vessel and adding the other aqueous solution, for example, dropwise or in a jet.

The at least two aqueous solutions are preferably combined with stirring. A stirring power in the range from, for example, 0.1 to 20 W/l of suspension can be introduced by the stirring.

Combining the solutions forms a suspension.

When carrying out the process of the invention, portions of suspension are taken from the stirred vessel, either continuously or discontinuously. For the present purposes, "portions" is intended to refer to particular partial amounts, for example, in the range from 0.1 to 30% by volume, of the suspension, preferably from 2 to 15% by volume. When portions of the suspension are to be taken off discontinuously, portions of the suspension can be taken from the stirred vessel at intervals, for example every second to every 10 minutes.

In an embodiment of the present invention, from 5 to 20% by volume of the suspension is present in the two separation apparatuses. This means that during operation in the steady state or in discontinuous operation, from 5 to 20% by volume of the suspension formed is in the solid-liquid separation apparatus or in the liquid-gaseous separation apparatus and the remainder of the suspension is predominantly in the stirred vessel and that the portions of the suspension in the lines between the separation apparatuses and in the lines between one separation apparatus and the stirred vessel are disregarded.

The portions of the suspension can be taken off, for example, via an overflow or by means of a pump, preferably by means of a peristaltic pump or membrane pump or by means of a vacuum pump having a precipitation device.

The portions taken off in this way are processed in a combination of two separation apparatuses which are connected in series and comprise a first separation apparatus and a second separation apparatus which can be connected to one another, for example, via one or more lines. In a variant of the present invention, the portions taken off are processed in a sedimenter divided into two sections, for example, in a baffle plate thickener divided into two sections, where the portions taken off firstly pass through one section, referred to as the front section, of the baffle plate thickener which functions as liquid-gaseous separation apparatus and then through a further section which functions as solid-liquid separation apparatus.

Here, gas, for example, gas bubbles which have been introduced into the suspension by stirring in the stirred vessel, is separated off in a first separation apparatus which is selected from liquid-gaseous separation apparatuses. The gas which has been separated off can, for example, be recirculated via a two-way line to the stirred vessel or to the gas scrub. The first separation apparatus, which is selected from liquid-gaseous separation apparatuses, can be specifically selected from a first section of a separation apparatus, where gas is separated off in the relevant section.

Liquid-gaseous separation apparatuses can be configured as a vessel, for example as a tube, horizontal or vertical or preferably inclined, preferably as a tube which has an angle in the range from 1 to 30° to the horizontal and at the upper end of which there is a connection to a line. In a variant, one or more filtration apparatuses can also be stored. In a preferred embodiment of the present invention, liquid-gaseous separation apparatuses are configured as part of a sedimenter, preferably as part of a baffle plate thickener, with gas rising in the form of gas bubbles in the relevant part of the sedimenter and being separated from the liquid phase or the suspension phase.

In a second separation apparatus, which is selected from solid-liquid separation apparatuses, mother liquor is separated off from the precipitated sparingly soluble solid and the mother liquor is taken off. Solid-liquid separation apparatuses can preferably be selected from among sedimenters, for example from among slanted clarifiers and preferably baffle plate thickeners. Baffle plate thickeners can be configured as lamella precipitators, lamella clarifiers or lamella separators. In baffle plate thickeners which have one or more lamellae, the lamellae for the process of the invention can, for example, be made of polypropylene or of glass, metal, Teflon, in particular also of PVDF. The lamellae are preferably smooth lamellae, with the smoothness preferably being assessed by the incidence of light or by determination of the peak-to-valley height. The peak-to-valley height is preferably less than 0.1 µm, very particularly preferably less than the measurement accuracy. The average peak-to-valley height can, for example, be 0.05 µm or less. The peak-to-valley height can be determined by the methods described in ISO EN 25178-2:2012, in particular by means of non-destructive optical methods.

The second separation apparatus, which is selected from solid-liquid separation apparatuses, can be specifically selected from a second section of a separation apparatus, where mother liquor is separated off from the precipitated sparingly soluble solid in the relevant section and the mother liquor is taken off.

In a particular embodiment, the combination of two separation apparatuses is a slanted clarifier having two sections, of which one functions as liquid-gas separation apparatus and the other functions as liquid-solid separation apparatus. The section which functions as liquid-gas separation apparatus can, for example, have a two-way line through which separated-off gas can be returned to the stirred vessel or be conveyed to the gas scrub.

The processing in the solid-liquid separation apparatus gives firstly mother liquor and secondly precipitated solid, which can be obtained in pure or strongly enriched form, for example as slurry, for example with a solids content in the range from 300 to 800 g/l. The solid which has been separated off or enriched in this way, i.e. in the solid-liquid separation apparatus, is returned to the reaction mixture. The mother liquor can be discarded or, for example, used for flushing parts of the stirred vessel or the liquid-gaseous separation apparatus. In particular, the mother liquor can be used to prevent accumulation or sedimentation of solid at undesirable places.

The term mother liquor refers, for the present purposes, to water, water-soluble salts and any further additives which are present in solution. Possible water-soluble salts are, for example, alkali metal salts of the counterions of transition metals, for example, sodium acetate, potassium acetate, sodium sulfate, potassium sulfate, sodium nitrate, potassium nitrate, sodium halide, in particular sodium chloride, potassium halide, also additional salts, any additives used and possibly excess alkali metal carbonate or alkali metal hydroxide, also ligands, for example ammonia. Furthermore, the mother liquor can comprise traces of soluble transition metal salts.

In an embodiment of the present invention, the process of the invention is carried out at temperatures in the range from 10 to 85° C., preferably at temperatures in the range from 20 to 50° C.

Here, it is possible for the temperature in the stirred vessel to be essentially the same as in the liquid-gaseous separation apparatus or in the solid-liquid separation apparatus, or for it to be higher in the stirred vessel. In this context, "essentially the same as" means a maximum temperature difference of 5° C. Preference is given to no heat being introduced into the suspension or mother liquor in the combination of two separation apparatuses.

In a preferred embodiment of the present invention, the process of the invention is carried out at an average temperature in the combination of separation apparatuses which is from 1 to 20° C. below the temperature in the stirred vessel.

In an embodiment of the present invention, the process of the invention is carried out at a pH in the range from 8 to 12.5, preferably from 11.3 to 12.0. Here, the pH can be essentially constant during the course of the process or can increase by up to 0.2 units or decrease by up to 1.0 units or fluctuate by up to 0.2 units. However, the pH preferably does not go below the lower limit of 8 or above the upper limit of 12.5.

In an embodiment of the present invention, the process of the invention is carried out at a pressure in the range from 500 mbar to 20 bar with preference being given to atmospheric pressure.

In an embodiment of the present invention, the reaction time of the process of the invention is in the range from one to 40 hours. If the process of the invention is to be carried out continuously, the reaction time corresponds to the average residence time. In the case of continuous operation of the process of the invention, the reaction time is preferably from 5 to 13 hours, while in the case of a discontinuous process it is preferably in the range from 14 to 30 hours.

The process of the invention produces solids which are obtained in particulate form. These can be separated off from the mother liquor, for example by filtration, centrifugation, decantation, spray drying or sedimentation or by a combination of two or more of the abovementioned operations. Suitable apparatuses are, for example, filter presses, belt filters, spray dryers, hydrocyclones, baffle plate thickener apparatuses or combinations of the abovementioned apparatuses.

To improve the separation, it is possible, for example, to wash with pure water or with an aqueous solution of alkali metal carbonate or alkali metal hydroxide, in particular with an aqueous solution of sodium carbonate, potassium carbonate, sodium hydroxide, potassium hydroxide, lithium hydroxide or ammonia. Water and an aqueous solution of alkali metal hydroxide, in particular of sodium hydroxide, are preferred.

Washing can, for example, be carried out at elevated pressure or elevated temperature, for example from 30 to 50° C. In another variant, washing is carried out at room temperature. The efficiency of washing can be checked by means of analytical measures. Thus, for example, the content of transition metal(s) in the washings can be analyzed.

If water rather than an aqueous solution of alkali metal hydroxide is used for washing, it is possible to check by means of conductivity measurements of the washings whether water-soluble substances, for example water-soluble salts, can still be washed out.

After the particles according to the invention have been separated off, they can be dried. Drying can be carried out, for example, using inert gas or using air. Drying can, for example, be carried out at a temperature in the range from 30 to 150° C. If drying is carried out using air, it is in many cases observed that some transition metals partially oxidize, for example $Mn^{2+}$ to $Mn^{4+}$ and $Co^{2+}$ to $Co^{3+}$, and a black coloration of the solids produced by the process of the invention is observed.

Solids produced by the process of the invention are excellent precursors for electrode materials.

In an embodiment of the present invention, solids produced by the process of the invention have an essentially spherical shape. For the present purposes, not only particles which are exactly spherical but also particles in which maximum and minimum diameter of at least 95% (number average) of particles in a representative sample differ by not more than 20%, preferably not more than 15%, are considered to be spherical. In a specific embodiment of the present invention, particles produced by the process of the invention are exactly spherical. In another embodiment of the present invention, spherical particles obtained are not ideally spherical but instead have a half-axis ratio in the range from 1.2 to 1.6, determined, for example, by means of scanning electron micrographs of representative samples.

In an embodiment of the present invention, solids produced by the process of the invention can have an average diameter (D50) in the range from 0.1 to 35 μm, preferably from 1 to 30 μm, particularly preferably from 2 to 20 μm, for example measured by light scattering. Suitable instruments are commercially available, for example Malvern Mastersizer.

In an embodiment of the present invention, solids produced by the process of the invention can be present in the form of agglomerates of primary particles. Such primary particles can, for example, have an average diameter in the range from 50 nm to 500 nm.

The solids produced by the process of the invention can be processed to form electrode materials for lithium ion batteries, for example, by mixing with a lithium salt and subsequent thermal treatment, for example, at temperatures in the range from 700 to 900° C. Electrode materials produced in this way have a very good energy density making it possible to produce electrodes having a high power rating.

In an embodiment of the present invention, solids produced by the process of the invention have a narrow particle diameter distribution. Thus, preference is given to the following inequalities being satisfied: $0.7 \cdot (D10) \geq (D50)$ and $(D90) \leq 1.4 \cdot (D50)$.

However, materials having a particularly narrow particle diameter distribution are advantageous in completely different precipitation products. The process of the invention is thus not restricted to precursors for cathode materials for lithium ion batteries.

In an embodiment of the present invention, spherical particles produced according to the invention have a uniform composition, determined over the cross section of the individual particles. In another embodiment of the present invention, particularly when different solutions of substances are introduced at different times or different places while carrying out the reaction, particles produced according to the invention can have a variable composition, determined over the cross section of the individual particle.

Spherical particles of mixed hydroxides of nickel, cobalt and manganese, which are partially oxidized, are thus preferably produced where the particles have an average diameter (D50) in the range from 0.1 to 35 μm, and for which the following inequalities are satisfied: $(D10) \geq 0.7 \cdot (D50)$ and $(D90) \leq 1.4 \cdot (D50)$.

In an embodiment of the present invention, particles according to the invention can be partially oxidized hydroxides of the general formula (I):

$$Ni_aCo_bMn_cM_dO_e(OH)_f \qquad (I)$$

where the variables are defined as follows:

M is Mg, Al, Ca and/or one or more transition metals, selected from among Fe, Cr and V, a is in the range from 0.4 to 0.8, preferably from 0.48 to 0.65, b is in the range from 0.1 to 0.4, preferably from 0.15 to 0.25, c is in the range from 0.1 to 0.5, preferably from 0.15 to 0.35, d is in the range from zero to 0.2, preferably from zero to 0.02, where: a+b+c+d=1, e is in the range from 0.05 to 1, preferably to 0.8, f is in the range from 0.5 to 1.9, preferably from 1.1 to 1.6, and where the average oxidation state of Ni, Co and Mn is in the range from 2.1 to 3.2.

The invention is illustrated by examples.

General remarks: in connection with gases, liters are standard liters, unless indicated otherwise. For the purposes of the present invention, percentages are % by weight, unless expressly indicated otherwise.

Production of spherical particles TH.1 according to the invention

The examples and comparative experiments were carried out in a reactor system having a total volume of 8 l, with the reactor system comprising a stirred vessel having a volume of 7 l and a baffle plate thickener having a volume of 1 l, which was divided into two sections and served as combination of two separation apparatuses. During the reaction, gas-bubble-containing suspension of TH.1 in mother liquor was taken off from the stirred vessel in the baffle plate thickener by means of a pump via the baffle plate thickener which had an angle of inclination of 35° and an effective cross section of 5 cm². The baffle plate thickener was divided into two regions. In the first region, from zero to 25 cm from the inlet for the suspension, separation of the liquid phase and gas phase (gas bubbles) took place, with some solid also sedimenting in the liquid phase. The gas obtained was recirculated via a two-way line to the gas space of the stirred vessel. The two-way gas line was designed so that only gas, and no liquid, can be exchanged between separation apparatus and gas space of the stirred vessel. In the second region of the baffle plate thickener, from 25 to 40 cm from the inlet for the suspension, separation of liquid phase and solid took place. The separated solid was returned to the stirred vessel; the mother liquor was removed.

The stirred vessel was equipped with inclined-blade stirrer and baffles. Measurement of the stirring power was carried out from speed of rotation and torque by means of an electric motor provided with torque measurement. Furthermore, the stirred vessel had a plurality of metering units with metering pumps and also an electrode for pH measurement and a temperature sensor. Furthermore, a fill level sensor was present in the stirred vessel and this regulated the discharge pump at the liquid-side connection to the separation apparatus in such a way that the level in the stirred vessel remains essentially constant. Solid was recirculated from the separation apparatus back to the stirred vessel. By means of the liquid-gaseous separation apparatus, gas was recirculated via the two-way line to the stirred vessel (pressure equalization, no pump or regulation). The amount of gas obtained was subject to fluctuations and can only be estimated, but in the case of the present apparatus is in the range from some milliliters to a few liters per hour of operation.

The gas space, about 2 liters, in the stirred vessel was flushed with 40 l/h of nitrogen while carrying out the precipitation.

The following aqueous solutions were used:

Aqueous solution (A.1): 5.356 mol of NaOH per kg of solution and 2.1 mol of $NH_3$ per kg of solution, produced from 25% by weight of aqueous NaOH and 25% by weight of aqueous ammonia solution.

Aqueous solution (B.1): 0.55 mol per kg of solution of nickel sulfate, 0.55 mol per kg of solution of cobalt sulfate, and 0.55 mol per kg of solution of manganese sulfate, produced by dissolving the corresponding hydrate complexes in water.

Aqueous solution (C.1): 6.25 mol of NaOH per kg of solution.

Aqueous solutions (A.1), (B.1) were introduced via metering pumps; solution (C.1) was introduced in such a way that the pH in the stirred vessel remains constant (pH regulation).

Experimental Procedure

At the beginning, 8 l of ammonium sulfate solution having a concentration of 45.9 g/l was placed in the reactor system and heated to 45° C.

The ammonium sulfate solution was brought to pH 11.3, measured in the cooled solution at 23° C., by addition of solution (C.1). The solutions (B.1) and (A.1) were then introduced by means of metering pumps at a constant mass flow (1060.9/462.9 g/h) into the turbulent zone in the vicinity of the stirrer blades of the stirred vessel of the reactor system. The pH was kept constant at 11.3 (measured at 23° C.) by means of a regulating device and addition of solution (C.1). A suspension of transition metal hydroxide (molar ratio in the particles: Ni:Co:Mn=32:34:34) formed. After 2 hours, the flow of (B.1) was increased to 525.4 g/h, and the setpoint value of the pH regulation was adjusted to 11.4.

The contents of the stirred vessel were continually mixed during the reaction, with mechanical work of about 45 watt being introduced into the contents. The specific power input in the stirred vessel was thus about 3.5 watt per liter. In the baffle plate thickener, stirring power was not introduced nor was the clarifier heated.

The total duration of the metered addition was 24.08 hours, and stirring was then continued for another 15 minutes without feed streams.

During the course of the reaction, the level of liquid in the stirred vessel was, as described above, kept constant by taking off mother liquor from the baffle plate thickener. A total of about 30 l of mother liquor was taken off.

Measurement of the solids content in the stirred vessel and in the separation apparatus indicated that the solids content in the separation apparatus was about 3% of the total amount of solid in the total reactor system (stirred vessel and baffle plate thickener).

A suspension of transition metal hydroxide TH.1, having a molar ratio of Ni:Co:Mn of 32:34:34 was obtained. The transition metal hydroxide suspension present in the stirred vessel and baffle plate thickener was filtered through a suction filter, the filter cake was washed with water and dried at 105° C. for a period of 18 hours in the presence of air. The spherical particles which can be obtained in this way had a composition of 20% by weight of nickel, 22% by weight of cobalt and 21% by weight of manganese, in each case based on the particles, and were present in partially oxidized form. The spherical particles were sieved (mesh opening 50 μm; coarse material: 0.6%) and the tamped density was determined (1.68 kg/l). 3.46 kg of TH.1 were obtained. A partial amount was suspended in water and the particle size was determined by light scattering (Malvern Mastersizer 2000). The average particle size D50 was 8.69 μm, at a narrow particle diameter distribution, D10=6.33 μm; D90=12.01 μm. The D10/D50 ratio was calculated as 0.728, and the D90/D50 ratio was calculated as 1.382.

The particles obtained were virtually ideally spherical, estimated half-axis ratio about 1.2-1.6, measured by means of scanning electron micrographs on the powders.

The invention claimed is:

1. A process for producing a suspension, comprising:
combining at least two solutions of salts in a reaction mixture in a stirred vessel so as to form a suspension of a sparingly soluble solid,
taking off portions of the suspension continuously or discontinuously, and
processing the portions taken off in a combination of a first separation apparatus, which is a liquid-gas separation apparatus, and a second separation apparatus, which is a solid-liquid separation apparatus, or in a baffle plate thickener having a first and a second section, of which the first section functions as a liquid-gas separation apparatus and the second section functions as a solid-liquid separation apparatus,
wherein
gas is separated off in the first separation apparatus, or in the first section of the baffle plate thickener,
mother liquor is separated off from precipitated sparingly soluble solid in the second separation apparatus, or in the second section of the baffle plate thickener, and taken off so as to obtain the solid, and
the solid is reintroduced into the reaction mixture.

2. The process according to claim 1, wherein a concentration of solid in the mother liquor is increased in the second separation apparatus or in the second section of the baffle plate thickener.

3. The process according to claim 1, wherein
the combination of the first and second separation apparatuses is used, and
the liquid-gaseous separation apparatus is configured as a tube which has an angle of from 1 to 30° and has a connection to a line at an upper end.

4. The process according to claim 1, wherein the sparingly soluble solid is at least one of a hydroxide and a carbonate of at least one transition metal.

5. The process according to claim 1, wherein the sparingly soluble solid is at least one of a hydroxide and a carbonate of nickel, cobalt and/or manganese.

6. The process according to claim 1, wherein
the combination of the first and second separation apparatuses is used, and
the second separation apparatus is a sedimenter.

7. The process according to claim 1, wherein
gas bubbles are introduced into the suspension by stirring in the stirred vessel,
the combination of the first and second separation apparatuses is used, and
the gas bubbles are separated off in the first separation apparatus.

8. The process according to claim 1, wherein
the combination of the first and second separation apparatuses is used, and from 0.5 to 20% by volume of the suspension is in the first and second separation apparatuses.

9. The process according to claim 1, wherein the solutions of salts are introduced during the taking-off of mother liquor and reintroduction of the solid.

10. The process according to claim 1, wherein from 0.1 to 5% by weight of the precipitated solid is present in the liquid-gas separation apparatus or in the first section of the baffle plate thickener.

* * * * *

UNITED STATES PATENT AND TRADEMARK OFFICE
CERTIFICATE OF CORRECTION

PATENT NO. : 10,059,602 B2
APPLICATION NO. : 14/889928
DATED : August 28, 2018
INVENTOR(S) : Simon Schroedle Page 1 of 1

It is certified that error appears in the above-identified patent and that said Letters Patent is hereby corrected as shown below:

In the Claims

In Column 11, Line 1, Claim 8, delete "from 0.5" and insert -- from 5 --, therefor.

Signed and Sealed this
Twenty-eighth Day of April, 2020

Andrei Iancu
*Director of the United States Patent and Trademark Office*